(12) United States Patent  
Wilson

(10) Patent No.: US 7,207,803 B2
(45) Date of Patent: Apr. 24, 2007

(54) EARTH GLOBE ASSEMBLY

(76) Inventor: Keith P. Wilson, 760 Fairmount Ave., St. Paul, MN (US) 55105

( * ) Notice: Subject to any disclaimer, the term of this patent is extended or adjusted under 35 U.S.C. 154(b) by 322 days.

(21) Appl. No.: 10/985,190

(22) Filed: Nov. 9, 2004

(65) Prior Publication Data
US 2006/0073443 A1    Apr. 6, 2006

Related U.S. Application Data

(60) Provisional application No. 60/605,209, filed on Aug. 27, 2004.

(51) Int. Cl.
G09B 27/08    (2006.01)
(52) U.S. Cl. .................................. 434/131
(58) Field of Classification Search ............... 434/130, 434/131, 132, 135, 136, 139, 141–149
See application file for complete search history.

(56) References Cited

U.S. PATENT DOCUMENTS

| 4,098 | A |   | 7/1845  | Cornell |
|---|---|---|---|---|
| 69,408 | A |   | 10/1867 | Clarke |
| 171,472 | A | * | 12/1875 | Durant .................. 434/131 |
| 209,993 | A |   | 11/1878 | Turnbull et al. |
| 253,508 | A |   | 2/1882  | Cheney |
| 651,804 | A |   | 6/1900  | Houghton |
| 895,263 | A | * | 8/1908  | Harger .................. 434/141 |
| 1,498,225 | A |   | 6/1924  | Baird |
| 2,020,284 | A | * | 11/1935 | Beck .................... 434/143 |
| 2,099,518 | A | * | 11/1937 | Hazlett .................. 368/24 |
| 2,102,413 | A | * | 12/1937 | Hall ..................... 434/143 |
| 2,151,601 | A | * | 3/1939  | Johnson ................. 434/141 |
| 2,403,920 | A | * | 7/1946  | Hagner .................. 434/142 |
| 2,405,418 | A |   | 8/1946  | Fukal ..................... 35/46 |
| D184,882 | S |   | 4/1959  | Mapes et al. ............ D33/3 |
| 2,939,225 | A |   | 6/1960  | Mapes et al. ............. 35/46 |
| 2,958,959 | A |   | 11/1960 | Hubbard .................. 35/46 |
| 2,971,276 | A |   | 2/1961  | Scarborough et al. ...... 35/46 |
| 3,052,993 | A |   | 9/1962  | Olson ..................... 35/46 |
| 3,100,353 | A |   | 8/1963  | Chamberlin ............... 35/46 |
| 3,133,359 | A | * | 5/1964  | Kuriyama ................ 434/131 |
| 3,241,252 | A |   | 3/1966  | Baalson .................... 35/46 |
| 3,292,361 | A | * | 12/1966 | Redmond .................. 368/23 |
| 3,305,946 | A | * | 2/1967  | Gardin ................... 434/143 |
| 3,360,196 | A | * | 12/1967 | Grega .................... 235/88 R |
| 3,370,415 | A | * | 2/1968  | McIlvaine ................ 368/24 |
| 3,374,560 | A | * | 3/1968  | Forsyth .................. 434/137 |
| 3,903,618 | A | * | 9/1975  | Rogers ................... 434/141 |
| 3,997,980 | A | * | 12/1976 | Rogers ................... 434/141 |

(Continued)

OTHER PUBLICATIONS

Scanglobe®, product pages from www.scanglobe.com (4 pages).

(Continued)

Primary Examiner—Kurt Fernstrom
(74) Attorney, Agent, or Firm—Kagan Binder, PLLC

(57) ABSTRACT

An educational globe assembly is provided comprising a globe and a base cradle for the globe configured to removably and rotatably support the globe. The base cradle comprises a great circle ring, and the great circle ring comprises at least one annular indicia surface that is capable of rotation in the plane of the great circle ring. Base cradles are separately provided. Methods of use of the educational globe assembly are also described.

16 Claims, 7 Drawing Sheets

U.S. PATENT DOCUMENTS

| | | | | |
|---|---|---|---|---|
| 4,056,927 | A * | 11/1977 | Wilson | 368/24 |
| 4,102,121 | A * | 7/1978 | Veazey | 368/24 |
| 4,300,887 | A | 11/1981 | Riemer | 434/132 |
| 4,368,578 | A | 1/1983 | Carroll et al. | 33/1 SA |
| D270,548 | S | 9/1983 | Rimer | D19/61 |
| D274,340 | S | 6/1984 | Reyhani | D19/61 |
| 4,761,138 | A * | 8/1988 | Niesyn | 434/143 |
| 4,936,779 | A * | 6/1990 | Carlson | 434/143 |
| 4,971,559 | A * | 11/1990 | Amano | 434/143 |
| 5,132,943 | A * | 7/1992 | Davies | 434/142 |
| 5,280,458 | A * | 1/1994 | Scott | 368/24 |
| 5,580,253 | A | 12/1996 | Abdalla | 434/132 |
| 5,657,552 | A | 8/1997 | Reineck et al. | 33/784 |
| 6,299,451 | B1 * | 10/2001 | Davila | 434/142 |
| D464,677 | S | 10/2002 | Chan | D19/61 |
| D464,678 | S | 10/2002 | Chan | D19/61 |
| 6,612,843 | B1 | 9/2003 | Riggs | 434/131 |
| 2003/0215773 | A1 | 11/2003 | Green et al. | 434/131 |

OTHER PUBLICATIONS

Replogle Globes® product pages from www.replogleglobes.com (2 pages).

Eureka Globes product pages from www.maps-eureka.com (2 pages).

1-World Globe product page from www.1worldglobe.com (1 page).

U.S. Appl. No. 10/985,185, filed Nov. 9, 2004, entitled "Globes Having Marked Zones of Geographic Interest" (18 pgs).

* cited by examiner

EARTH GLOBE ASSEMBLY

PRIORITY CLAIM

This Non-provisional Patent Application claims priority from United States Provisional Patent Application having Ser. No. 60/605,209, filed on Aug. 27, 2004, and titled EARTH GLOBE ASSEMBLY, wherein the entire contents of said provisional application is incorporated herein by reference.

FIELD OF THE INVENTION

The present invention relates to base cradles for globes, and for educational globe assemblies.

BACKGROUND OF THE INVENTION

Globe assemblies have been used for many years to illustrate various features of earth geography and of relative position and relationships of the Earth to the Sun, planets and stars.

In the globe and stand assembly as described in U.S. Pat. No. 209,993, a globe is mounted on an axis running through the north and south poles, around which the globe can revolve. The stand is further provided with a great circle fixed at the ecliptic plane, consisting of a fixed outer circle R and an inner circle G that is capable of revolving around the globe on friction-rollers.

An alternative configuration of a globe stand is described in U.S. Pat. No. 2,939,225, which discloses a globe stand arranged to support a globe on a plurality of points to permit universal movement thereof. The supporting points of the globe stand are spatially correlated with a horizontal ring to dispose the horizon ring around the midportion of the globe. This horizon ring comprises a first, horizontally fixed arcuate element, and a second arcuate element movably associated with the first element to serve alternatively as a portion of the horizon ring and as a movable element out of the plane of the horizon ring.

In another globe assembly, a globe is described in a supporting structure that may include a great circle ring marked with appropriate indicia in U.S. Pat. No. 3,100,353. This assembly is provided with a measuring devices that is a separate piece in the form of a spherical protractor having an inner radius that is substantially the same as or slightly larger than the radius of the globe. When one wishes to make measurements on the globe, one positions the protractor on the globe and uses the markings thereon to carry out the desired measurements.

SUMMARY OF THE INVENTION

The present invention relates to an educational globe assembly comprising a globe and a base cradle for the globe configured to removably and rotatably support the globe. The base cradle comprises a great circle ring that in turn comprises at least one annular indicia surface that is capable of rotation in the plane of the great circle ring.

Because the great circle ring comprises annular indicia that is capable of rotation in the plane of the great circle ring, one can readily position the globe in the base cradle to place desired locations of interest at the great circle and then rotate the indicia to carry out the desired analysis without further adjustment of the globe in the cradle. This ease of analysis is far superior to alternative globe assemblies that fix the position of the globe at a predetermined angle relative to the great circle associated with the stand. Additionally, the present globe assembly is superior to globe assemblies having universal movement within the stand, but with stationary indicia on the stand. In such prior art assemblies, the user must continuously reposition the globe in the stand to carry out the desired analysis because the indicia is fixed relative to any initial placement of the globe in the stand.

Advantageously, the great circle ring of the base cradle is a useful guide for marking great circles, either temporarily or permanently, on the globe. Because the globe is removably and rotatably supported in the base cradle, the great circle ring of the base cradle may be used as a guide not only for marking lines corresponding to the ecliptic, but also may be used for marking lines corresponding to any desired great circle or a portion of any desired great circle.

The annular indicia surface that is capable of rotation in the plane of the great circle ring may be freely rotated or may be provided with predetermined indexing positions in the rotation. For purposes of the present invention, an indexing position is a predetermined location in the rotation of an annular indicia surface comprising a temporary holding mechanism to prevent undesired rotation of the annular indicia surface. The interval of placement of the indexing position is preferably associated with the indicia on the annular indicia surface, to assist in carrying out measurements and/or relational studies with respect to the globe. In a preferred embodiment, the indicia on the annular indicia surface comprises zodiac symbols, constellation symbols or the like, and the annual indicia surface is provided with four indexing positions associated with the zodiac symbols or constellation symbols that generally correspond to placement of these symbols representing star locations in predetermined seasons of the year with respect to a location on the globe. In another preferred embodiment the indicia on the annular indicia surface comprises zodiac symbols, constellation symbols or the like, and the annual indicia surface is provided with twelve indexing positions associated with the zodiac symbols or constellation symbols that generally correspond to placement of these symbols representing star locations in predetermined months of the year with respect to a location on the globe.

DETAILED DESCRIPTION OF PRESENTLY PREFERRED EMBODIMENTS

Figure 1:
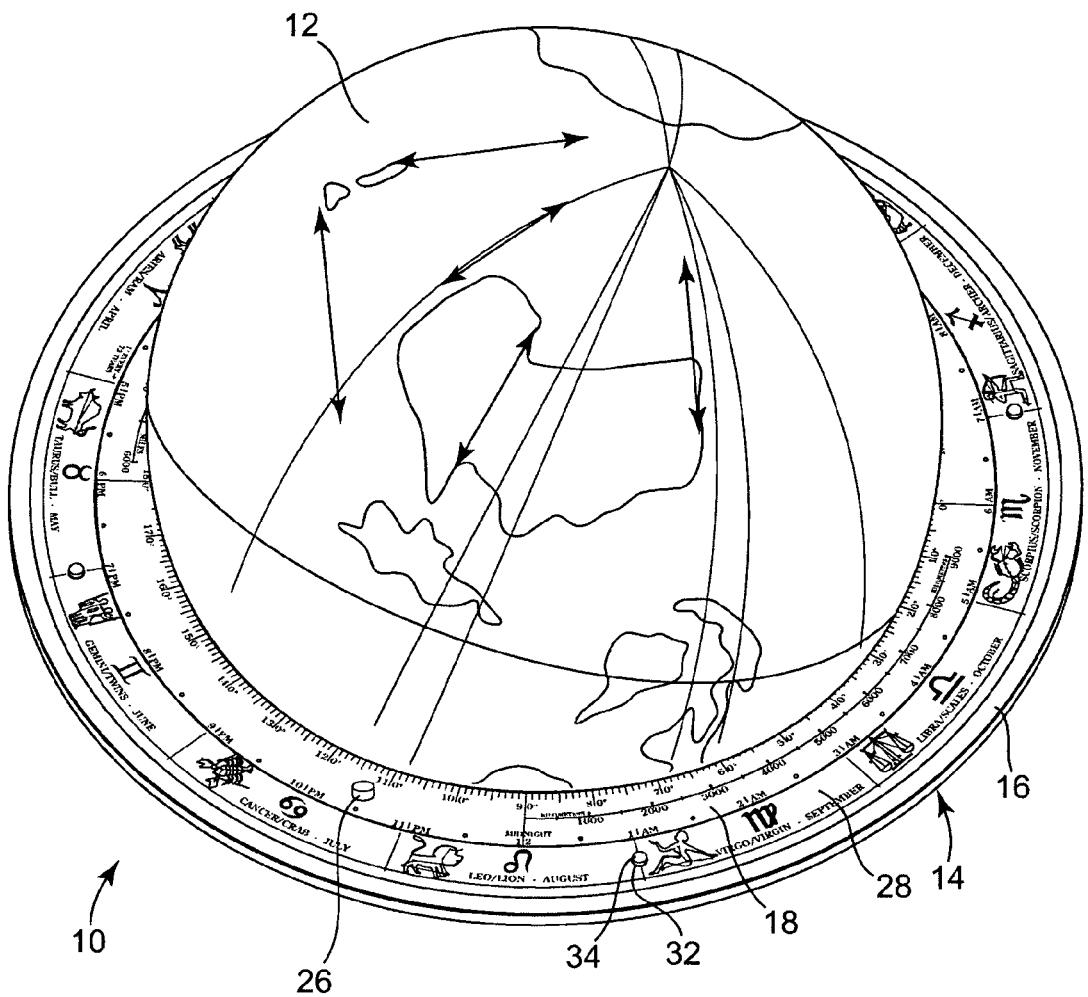
FIG. 1 is a perspective view generally from the top of an educational globe assembly comprising a globe and a base cradle configured to removably and rotatably support globe.

Turning now to the drawings, wherein like numerals indicate like parts, FIG. 1 is a perspective view generally from the top of an educational globe assembly 10 comprising a globe 12 and a base cradle 14 configured to removably and rotatably support globe 12. Base cradle 14 comprises a great circle ring 16. Great circle ring 16 as shown comprises a first annular indicia surface 18 that is capable of rotation in the plane of the great circle ring 16. The first annular indicia surface 18 comprises indicia such as degree indicia showing degrees of the great circle, mile measurement indicia and hour demarcation indicia. First annular indicia surface 18 optionally is provided with handles 26 to assist in rotation of first annular indicia surface 18 around globe 12 in the plane of great circle ring 16. Great circle ring 16 as shown additionally comprises a second annular indicia surface 28 that is capable of rotation in the plane of the great circle ring 16. The second annular indicia surface 28 as shown additionally comprises indicia, such as zodiac indicia or other indicia indicative of positioning of stars and the like. Second annular indicia surface 28 is optionally provided with holes 32 that correspond to pegs 34 projecting from great circle ring 16. Holes 32 in combination with pegs 34 are a temporary holding mechanism to prevent undesired rotation of the second annular indicia surface 28. Holes 32 are evenly spaced in predetermined locations in second annular indicia surface 28, specifically in four quadrants of second annular indicia surface 28, so that second annular indicia surface 28 can be rotated and positioned in one of four positions in the rotation, and held in position when holes 32 are placed over pegs 34, thereby providing four indexing positions associated with the zodiac symbols.

Figure 2:
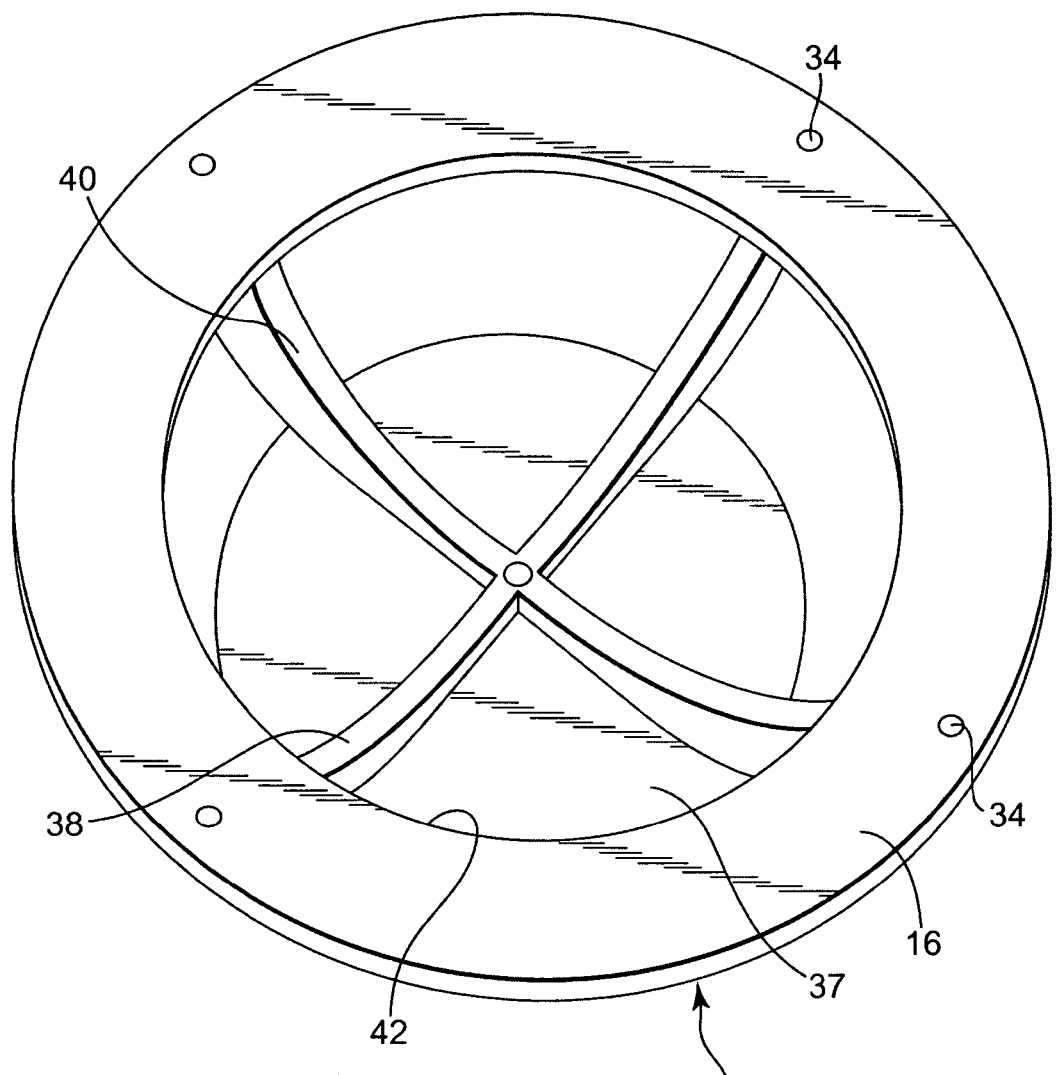
FIG. 2 is a perspective view generally from the top of a base cradle without the globe in position in the cradle.

FIG. 2 is a perspective view generally from the top of base cradle 14 without the globe in position in the cradle. As shown, base cradle 14 comprises a base portion 37, support members 38 and great circle ring 16. Support members 38 preferably are provided with a circular segment having an inner surface radius 40 approximately the same as, but slightly larger than, the radius of the globe to be positioned in the cradle. The inner radius 40 of support member 38 is preferably positioned to contact the globe along the entire surface of inner radius 40. In one embodiment of the present invention, the globe is supported in the base cradle by full contact with support members 38. In another embodiment, the globe is supported in the cradle by provision of one or more support projections from support members 38 and/or from base portion 37. Base cradle 14 additionally comprises great circle ring 16 having an inner diameter 42 that is slightly larger than the diameter of the globe that is to be supported by base cradle 14. In one embodiment of the present invention, one or more support projections for the globe may be provided from support members 38 and/or from base portion 37, and the globe is additionally supported by resting against inner diameter 42 of great circle ring 16. Pegs 34 project from great circle ring 16, and are preferably evenly spaced to provide temporary fixing of the position of an annular indicia surface that has been provided with corresponding holes. Base cradle 14 can be manufactured from any desired material, including metal, wood or plastic material, or combinations of diverse materials. Optionally, surfaces that are intended to contact the globe may be provided with a soft and/or non marring surface, such as felt, cloth, plastic, rubber and the like, to prevent surface damage to the globe as it is positioned in the base cradle 14.

Figure 3:
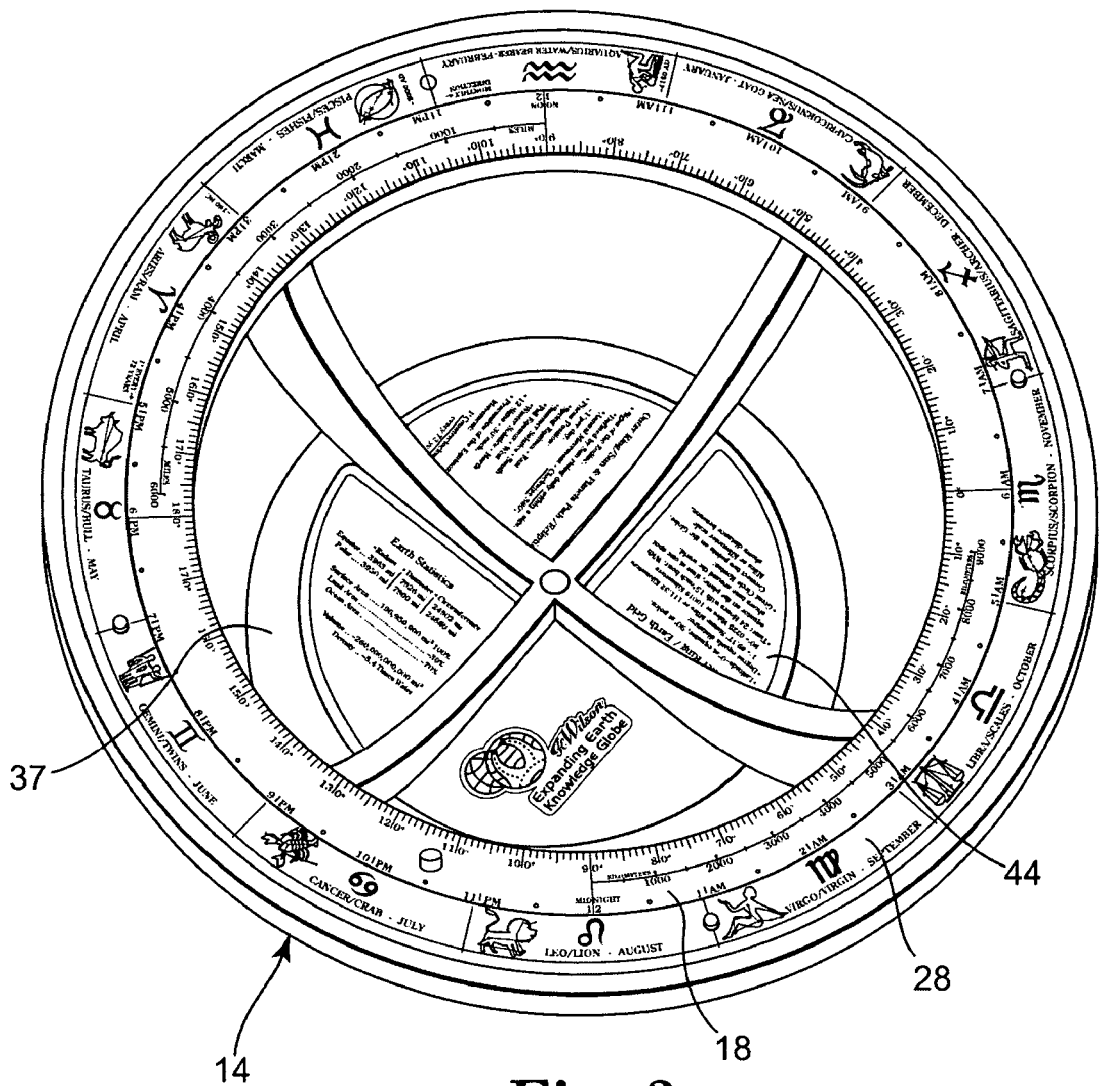
FIG. 3 is a perspective view generally from the top of the base cradle without the globe in position in the cradle, but additionally provided with first and second annular indicia surfaces.

FIG. 3 is a perspective view generally from the top of base cradle 14 without the globe in position in the cradle, but additionally provided with first annular indicia surface 18 and second annular indicia surface 28. Base portion 37 is optionally provided with base indicia sheet 44, that may provide product identification information, usage directions, facts about earth, the sun, the solar system and stars, and the like.

Figure 4:
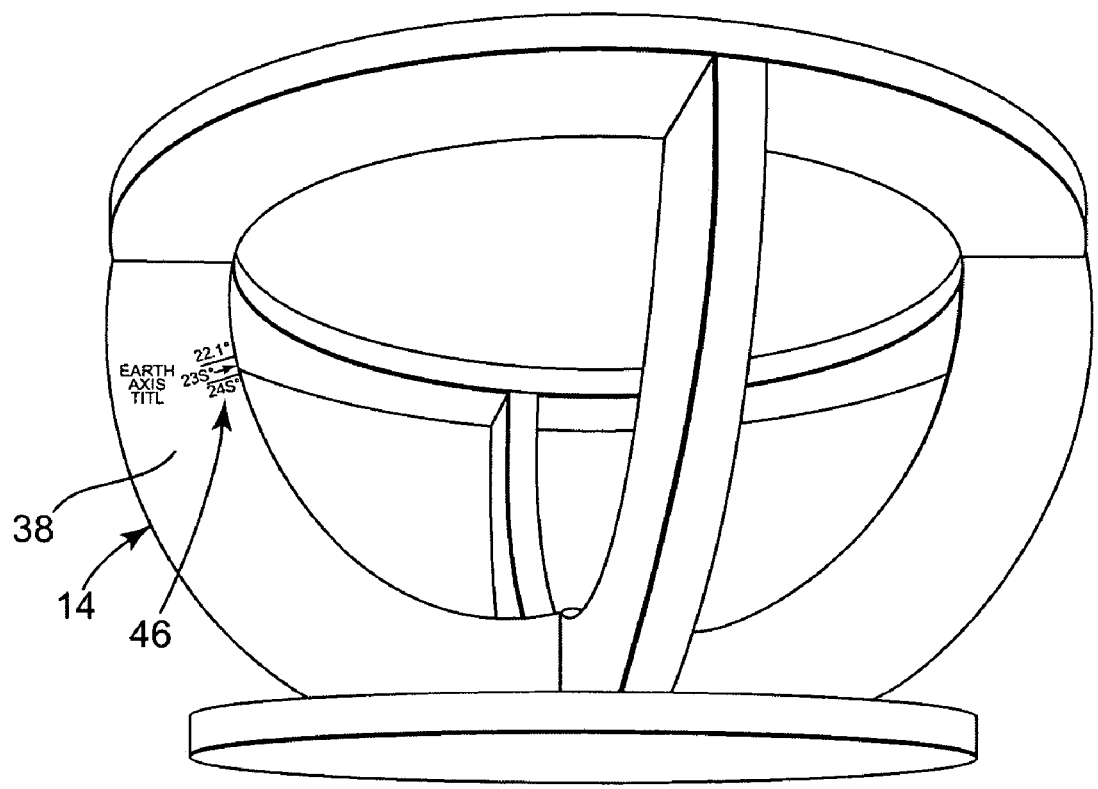
FIG. 4 is a perspective view generally from the side of a base cradle without the globe in position in the cradle.

FIG. 4 is a perspective view generally from the side of base cradle 14 without the globe in position in the cradle. As shown, support member 38 is provided with support indicia 46 indicating the alignment position of the equator on a globe in order to place the great circle ring at a position to indicate the ecliptic plane relative to the globe. In an alternative embodiment, indicia can be provided on one or more support members indicating the alignment position of either the north pole or the south pole on a globe in order to place the great circle ring at a position to indicate the ecliptic plane relative to the globe. In either embodiment, when the globe is placed in the base cradle at this position, the assembly is particularly helpful in illustrating the apparent motion of the sun or the stars or both the sun and the stars in relation to the earth during a year.

Figure 5:
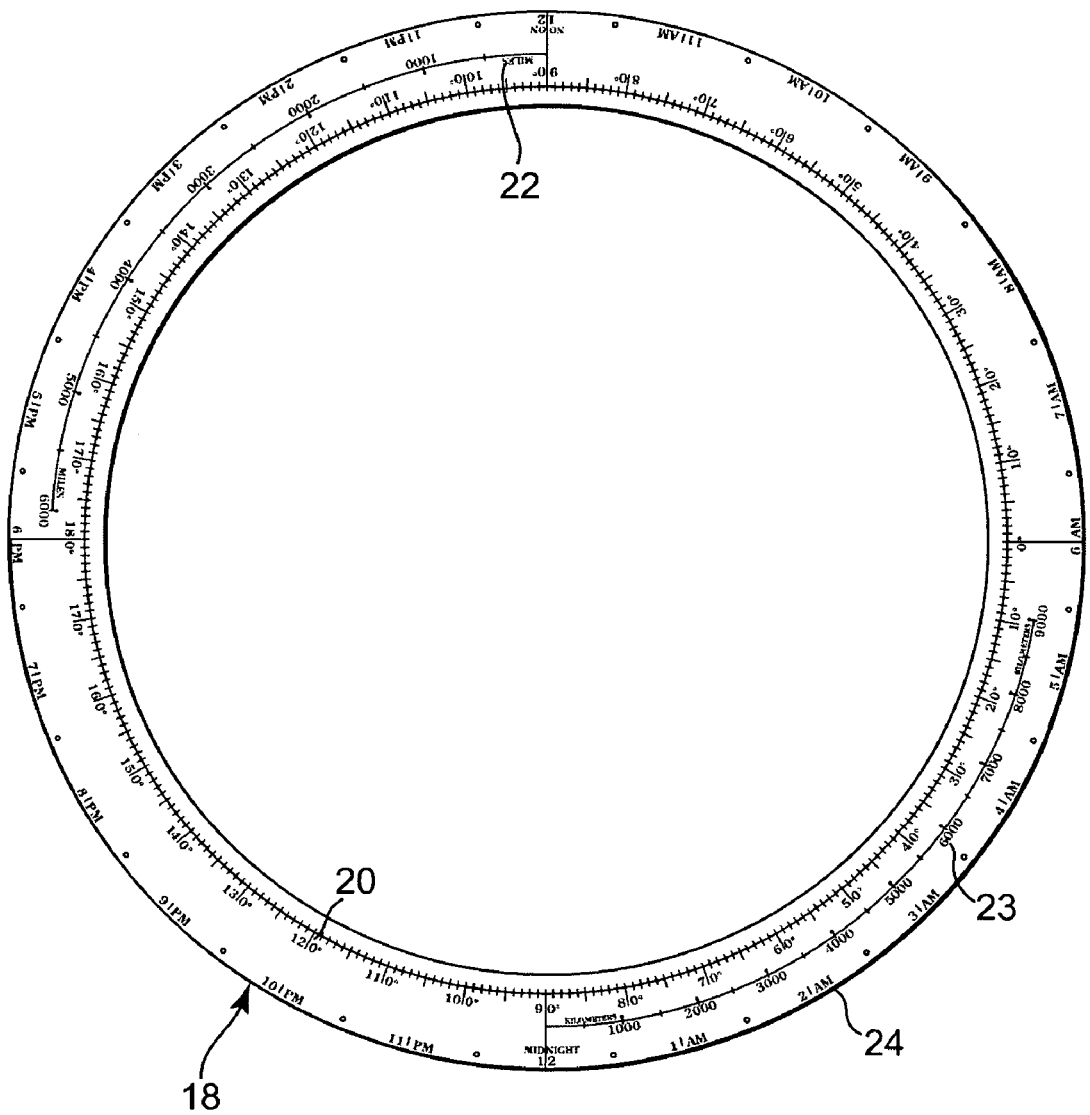
FIG. 5 is a plan view of a first annular indicia surface comprising indicia.

FIG. 5 is a plan view of first annular indicia surface 18, comprising degree indicia 20, showing degrees of the great circle and/or degrees corresponding to latitude. First annular indicia surface 18 additionally comprises mile measurement indicia 22, kilometer measurement indicia 23 and hour demarcation indicia 24. First annular indicia surface 18 may be fabricated from any appropriate material, such as paper, plastic, wood and metal, or combinations thereof. Preferably, first annular indicia surface is provided as an imaged plastic sheet, or as an imaged paper sheet that is subsequently laminated with a protective material, such as a transparent overlay. The indicia may be provided by any process appropriate to the material of the first annular indicia surface 18, and preferably is provided by a printing process such as by screen printing, offset printing or flexo printing. Alternatively, the indicia may be provided by a digital image process such as ink jet or laser jet printing, or the like.

Figure 6:
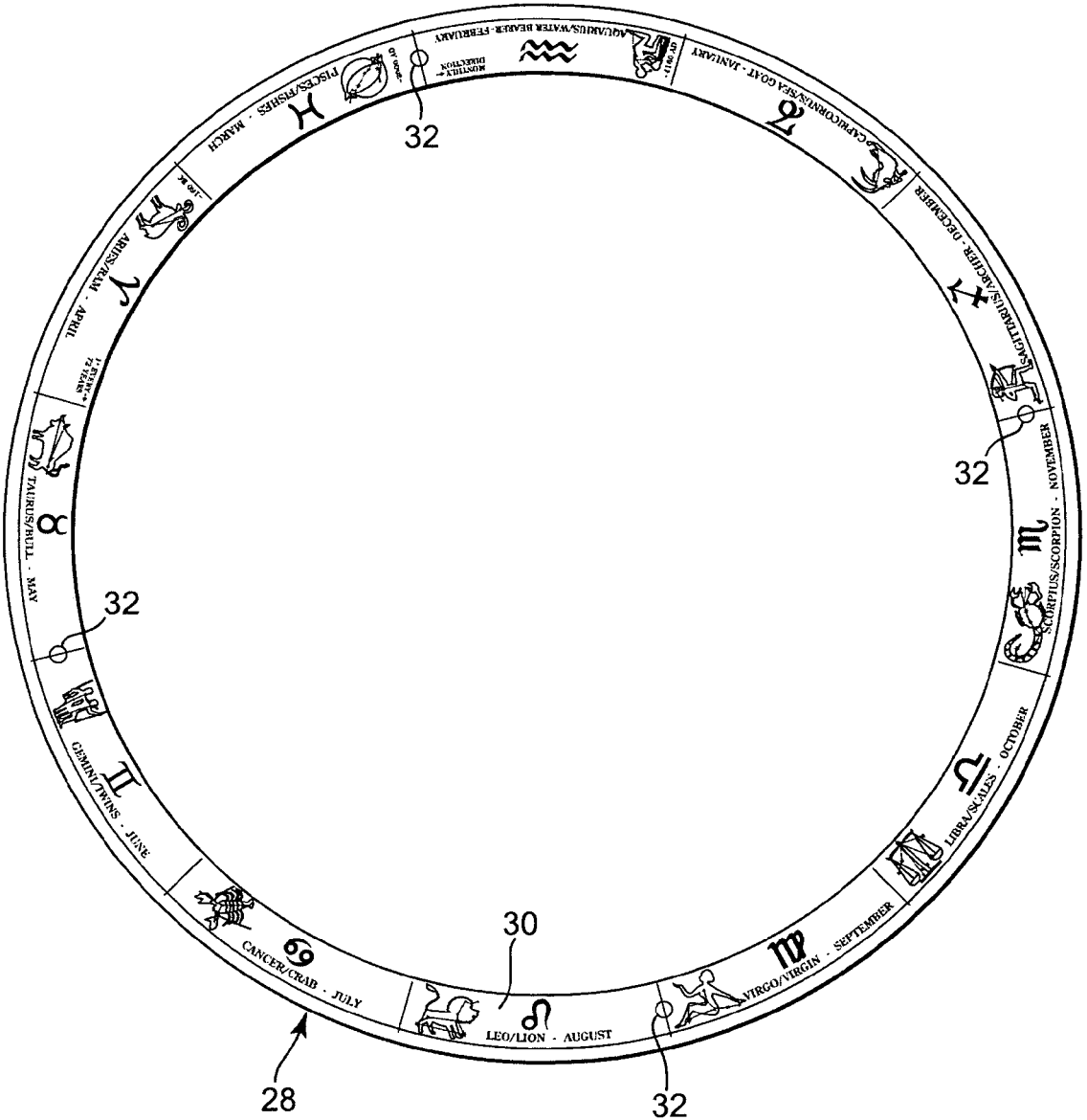
FIG. 6 is a plan view of a second annular indicia surface comprising indicia.

FIG. 6 is a plan view of second annular indicia surface 28, comprising zodiac indicia 30, demarking twelve evenly spaced zones of the great circle. Second annular indicia 28 are additionally provided with holes 32 evenly spaced in four quadrants of second annular indicia surface 28, so that second annular indicia surface 28 can be rotated and positioned in one of four positions in the rotation, and temporarily held in position when holes 32 are placed over pegs in the great circle ring. Alternative systems may be used that will now be apparent to the skilled artisan to provide temporarily fixed positions in the rotation of the second annular indicia surface 28. For example, the second annular indicia surface 28 can comprise projections that correspond with recessions located in predetermined locations on the great ring. Examples of projections include tabs and protrusions in any desired shape as can now be envisioned by the skilled artisan. Examples of recessions include notches, grooves, orifices, detents, and any other desired recession in any desired shape as can now be envisioned by the skilled artisan. As shown, holes 32 are provided in four positions, thereby allowing four graduated rotations of the second annular indicia surface 28 to indexing positions corresponding to the spring, summer, fall and winter equinox locations. Other indexing positions can be selected as desired, such as twelve positions corresponding to the months of the year. Second annular indicia surface 28 may be fabricated from any appropriate material, such as paper, plastic, wood and metal, or combinations thereof. Preferably, the second annular indicia surface 28 is provided as an imaged plastic sheet, or as an imaged paper sheet that is subsequently laminated with a protective material, such as a transparent overlay. The indicia may be provided by any process appropriate to the material of the second annular indicia surface 28, and preferably is provided by a printing process such as screen printing, offset printing or flexo printing. Alternatively, the indicia can be provided by a digital image process such as ink jet or laser jet printing, or the like.

Figure 7:
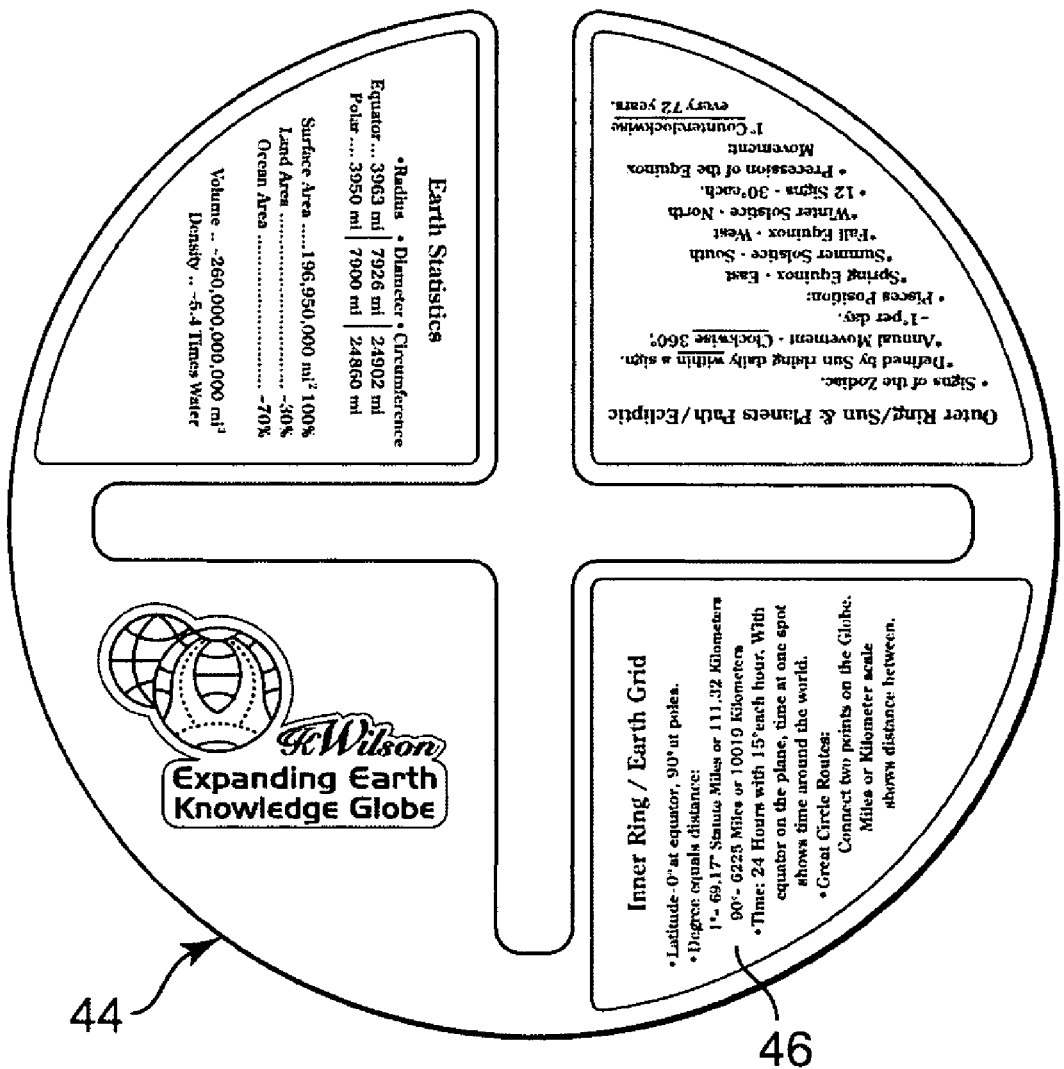
FIG. 7 is a plan view of base indicia sheet having indicia provided thereon.

FIG. 7 is a plan view of base indicia sheet 44 having indicia 46 provided thereon. The indicia that can provide additional information as desired, such as product identification information, usage directions, facts about earth, the sun, the solar system and stars, and the like. Base indicia sheet may be made from any appropriate material for the overall construction and design of the base cradle, and preferably is provided with an image of the indicia by a printing process such as screen printing, offset printing or flexo printing. Alternatively, the indicia can be provided by a digital image process such as ink jet or laser jet printing, or the like. In a preferred embodiment, base indicia sheet 44 is an imaged self adhesive paper or plastic sheet material that may be printed with indicia and cut to the desired configuration. This sheet is then adhered or placed onto the base of the base cradle.

The globe assembly of the present invention can be used in a number of ways to facilitate educational study both of the Earth and of the solar system and stars in relationship to the earth. In one aspect of the present invention, the globe can be placed in that base cradle in position whereby two points of interest are positioned corresponding to points on the great circle ring. Once so positioned, one or more of the annular indicia surfaces can be rotated to conveniently conduct measurements and other analysis using the indicia, without having to painstakingly position the points of interest not only relative to the great circle ring, but also the indicia. An example of a measurement that can be carried out is the distance in both miles and kilometers, as is defined by the segment of the great circle between the points of interest. This measurement can be conveniently carried out without repositioning the globe on the great circle ring by merely rotating the annular indicia surface to conduct each measurement separately as the measurement indicia are located on the annular indicia surface. Because of the rotation capability, the information provided on the annular indicia surface can be conveniently distributed around the ring, avoiding a confusing density of scales and indicia all starting at the same point on an annular indicia surface.

Advantageously, the great circle ring of the base cradle can be used as a guide for drawing segments or complete great circle on the globe. In one embodiment of the present invention, the globe can be so marked using an erasable or otherwise removable marker. In another embodiment, the markings on the globe can be made using a permanent marker.

In another advantageous use of the globe assembly of the present invention, the user can identify a location of interest, and carry out studies using an annular indicia surface containing zodiac indicia or other indicia indicative of positioning of stars relative to that location. In another embodiment, the globe can be positioned on the base cradle so that the great circle ring is provided at an elevation representative of the ecliptic. In this position, studies can be readily carried out to illustrate the rotation of the sun and stars through the year. In a preferred embodiment, the annular indicia surface is provided with indexing positions to assist in the study of relative positions of the stars at various seasons or months of the year. Most preferably, orienting indicia are provided to indicate the correct placement of the annular indicia surface containing zodiac indicia or other indicia indicative of positioning of stars when the globe is placed so that the great circle ring represents the ecliptic.

Other embodiments of this invention will be apparent to those skilled in the art upon consideration of this specification or from practice of the invention disclosed herein. All patents, patent documents, and publications cited herein are incorporated by reference as if individually incorporated. Various omissions, modifications, and changes to the principles and embodiments described herein can be made by one skilled in the art without departing from the true scope and spirit of the invention which is indicated by the following claims.

I claim:

1. An educational globe assembly comprising
a globe and
a base cradle for the globe configured to removably and rotatably support the globe, the base cradle comprising a great circle ring,
the great circle ring comprising at least one annular indicia surface that is capable of rotation in the plane of the great circle ring, wherein the base cradle comprises support members having a circular segment having an inner surface radius approximately the same as, but slightly larger than, the radius of the globe and positioned to correspond to the globe, said support members comprising indicia indicating the alignment position of the globe in order to place the great circle ring at the ecliptic.

2. The globe assembly of claim 1, wherein the annular indicia surface comprises indicia selected from indicia representative of time, distance, degrees of the great circle and combinations thereof.

3. The globe assembly of claim 1, wherein the annular indicia surface comprises indicia indicative of the apparent motion of the sun, stars, planets or a combination thereof in relation to the earth during a year.

4. The globe assembly of claim 3, wherein the indicia indicative of the apparent motion of the sun, stars, or both the sun and stars comprises zodiac symbols.

5. The globe assembly of claim 1, wherein at least one annular indicia surface is provided with predetermined indexing positions in the rotation.

6. The globe assembly of claim 5, additionally comprising at least one annular indicia surface that that is capable of free rotation in the plane of the great circle ring without predetermined indexing positions in the rotation.

7. The globe assembly of claim 1, wherein at least one annular indicia surface is provided with four indexing positions associated with zodiac symbols or constellation symbols provided on the at least one annular indicia surface.

8. The globe assembly of claim 1, wherein at least one annular indicia surface is provided with twelve indexing positions associated with zodiac symbols or constellation symbols provided on the at least one annular indicia surface.

9. A base cradle for a globe, wherein the base cradle is configured to removably and rotatably support the globe, the base cradle comprising a great circle ring, the great circle ring comprising an annular indicia surface that is capable of rotation in the plane of the great circle ring, wherein the base cradle comprises support members having a circular segment having an inner surface radius approximately the same as, but slightly larger than, the radius of the globe and positioned to correspond to the globe, said support members comprising indicia indicating the alignment position of theglobe in order to place the great circle ring at the ecliptic.

10. The base cradle of claim 9, wherein at least one annular indicia surface is provided with predetermined indexing positions in the rotation.

11. The globe assembly of claim 10, additionally comprising at least one annular indicia surface that that is capable of free rotation in the plane of the great circle ring without predetermined indexing positions in the rotation.

12. The base cradle of claim 9, wherein the annular indicia surface comprises indicia selected from indicia representative of time, distance, degrees of the great circle and combinations thereof.

13. The base cradle of claim 9, wherein the annular indicia surface comprises indicia indicative of the apparent motion of the sun, stars, planets or a combination thereof in relation to the earth during a year.

14. The base cradle of claim 9, wherein the indicia indicative of the apparent motion of the sun, stars, or both the sun and stars comprises zodiac symbols.

15. The base cradle of claim 9, wherein at least one annular indicia surface is provided with four indexing positions associated with zodiac symbols or constellation symbols provided on the at least one annular indicia surface.

16. The base cradle of claim 9, wherein at least one annular indicia surface is provided with twelve indexing positions associated with zodiac symbols or constellation symbols provided on the at least one annular indicia surface.

* * * * *